(12) United States Patent
Nakabayashi (10) Patent No.: US 10,742,835 B2
(45) Date of Patent: Aug. 11, 2020

(54) IMAGE COMMUNICATING APPARATUS, AND CONTROL METHOD

(71) Applicant: SHARP KABUSHIKI KAISHA, Sakai, Osaka (JP)

(72) Inventor: Makoto Nakabayashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/249,143

(22) Filed: Jan. 16, 2019

(65) Prior Publication Data
US 2019/0222713 A1 Jul. 18, 2019

(30) Foreign Application Priority Data
Jan. 18, 2018 (JP) .................................. 2018-006504

(51) Int. Cl.
*H04N 1/32* (2006.01)
*H04N 1/00* (2006.01)

(52) U.S. Cl.
CPC ....... *H04N 1/32096* (2013.01); *H04N 1/0048* (2013.01); *H04N 1/00209* (2013.01); *H04N 1/00331* (2013.01)

(58) Field of Classification Search
CPC ............. H04N 1/32096; H04N 1/0048; H04N 1/00331; H04N 1/00209
See application file for complete search history.

(56) References Cited

U.S. PATENT DOCUMENTS

| 6,233,316 | B1 * | 5/2001 | Schier | H04M 3/44 379/100.04 |
| 6,980,331 | B1 * | 12/2005 | Mooney | H04N 1/00358 358/3.28 |
| 2009/0141300 | A1 * | 6/2009 | Yamada | H04N 1/00209 358/1.13 |
| 2010/0214572 | A1 * | 8/2010 | Sensu | H04N 1/00212 358/1.2 |

FOREIGN PATENT DOCUMENTS

| JP | 2003-060772 A | 2/2003 |
| JP | 2005-159593 A | 6/2005 |

* cited by examiner

*Primary Examiner* — Neil R McLean
(74) *Attorney, Agent, or Firm* — ScienBiziP, P.C.

(57) ABSTRACT

An image communicating apparatus includes a controller, a communication unit that transmits an image to a transmission destination of input destination information, and a character recognizing unit that recognizes, from an image including destination information of a transmission destination, the destination information. The controller transmits an image to the transmission destination by using the communication unit in a case where the recognized destination information matches the input destination information. In addition, the image communicating apparatus includes a memory that stores input destination information. The input destination information is stored in the memory in a case where the input destination information matches the recognized destination information.

15 Claims, 11 Drawing Sheets

IMAGE COMMUNICATING APPARATUS, AND CONTROL METHOD

BACKGROUND

1. Field

The present disclosure relates to an image communicating apparatus capable of transmitting an image to an appropriate transmission destination.

2. Description of the Related Art

In the case of transmitting a fax, if a wrong fax destination number is input or selected, an important document may be leaked.

Therefore, there is disclosed, as measures for preventing transmission to a wrong destination, providing a function of allowing only a registered destination to be selected and prohibiting inputting of a fax destination number.

Alternatively, there is disclosed that, at the time of transmission, providing a function of asking the sender to input a fax destination number twice when inputting a fax destination number.

As related technologies, there is disclosed in Japanese Unexamined Patent Application Publication No. 2003-60772 the technology of a product provided with a function of not registering a to-be-registered destination number if that number is not the number of a fax-communicable terminal.

However, the technology of allowing only a registered destination to be selected is incapable of preventing transmission to a wrong destination if a wrong destination is registered in the first place.

In addition, in the case where the sender is asked to input a fax destination number twice, if the sender has misread a fax destination number in the first place, transmission to a wrong destination is not preventable.

Furthermore, the technology of Japanese Unexamined Patent Application Publication No. 2003-60712 is for confirming that the destination number is truly a fax destination number, and that the destination number is not deleted but is valid. This technology is based on determination on whether or not communication is possible, and is not for preventing transmission to a wrong destination from the viewpoint of information leakage.

In view of the foregoing circumstances of the related art, it is desirable to provide an image communicating apparatus capable of transmitting an image to an appropriate transmission destination.

SUMMARY

According to an aspect of the disclosure, there is provided an image communicating apparatus including: a controller; a communication unit that transmits an image to a transmission destination of input destination information; and a character recognizing unit that recognizes, from an image including destination information of a transmission destination, the destination information. The controller causes the communication unit to transmit an image to the transmission destination in a case where the input destination information matches the recognized destination information. In addition, the image communicating apparatus includes a memory that stores input destination information. The controller stores the input destination information in the memory in a case where the input destination information matches the recognized destination information.

According to another aspect of the disclosure, there is provided a control method for an image communicating apparatus that transmits an image to a transmission destination of input destination information, the method including: inputting destination information; recognizing, from an image including destination information of a transmission destination, the destination information; and determining whether the input destination information matches the recognized destination information. An image is transmitted in a case where the input destination information matches the recognized destination information. In addition, the input destination information is stored.

According to another aspect of the disclosure, there is provided a non-transitory recording medium storing a program causing an image communicating apparatus that transmits an image to a transmission destination of input destination information to operate, the program that when run on a computer causes the computer to execute a process including: inputting destination information; recognizing, from an image including destination information of a transmission destination, the destination information; and determining whether the input destination information matches the recognized destination information. An image is transmitted in a case where the input destination information matches the recognized destination information. In addition, the input destination information is stored.

DESCRIPTION OF THE EMBODIMENTS

Hereinafter, the case in which an image communicating apparatus according to the present disclosure is applied to a fax machine will be described. Note that embodiments are described for the sake of describing the present disclosure, and the scope of the present disclosure is not limited to the following embodiments. In addition, a fax machine may be realized as a digital multifunctional peripheral which is an image forming apparatus.

First Embodiment

Figure 1:
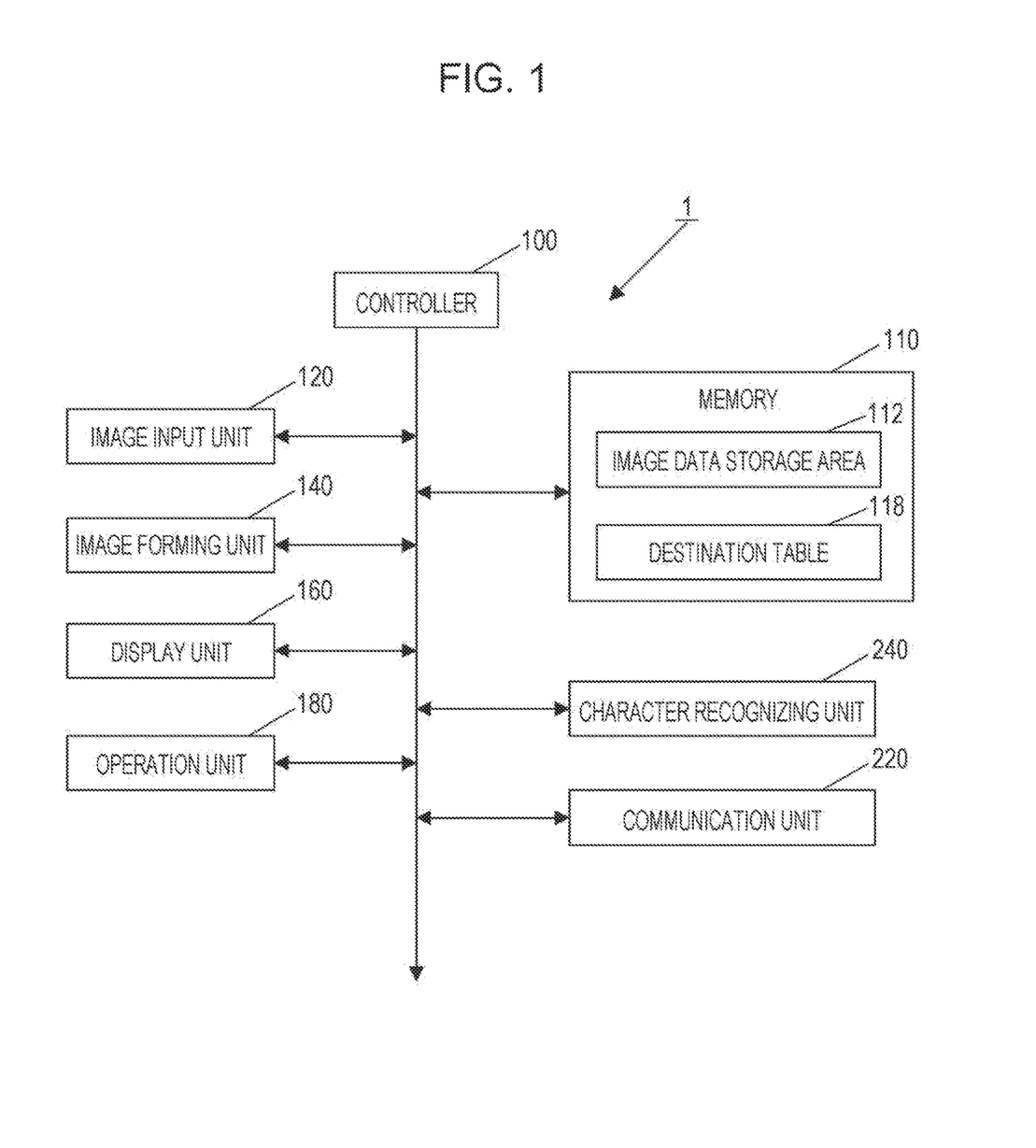
FIG. 1 is a block diagram illustrating the configuration of a fax machine according to a first and a second embodiment.

FIG. 1 is a block diagram illustrating the configuration of a fax machine 1 according to a first and a second embodiment.

The fax machine 1 according to the first and second embodiments mainly includes, as illustrated in FIG. 1, a controller 100, a memory 110, an image input unit 120, an image forming unit 140, a display unit 160, an operation unit 180, a communication unit 220, and a character recognizing unit 240.

The controller 100 is a function unit for controlling the entire fax machine 1. By reading and executing various programs stored in the memory 110, the controller 100 realizes various functions. The controller 100 includes, for example, a central processing unit (CPU).

The memory 110 is a function unit that stores various programs and various data necessary for the operation of the fax machine 1. The memory 110 includes, for example, a solid state drive (SSD), a semiconductor memory, and a hard disk drive (HDD).

In addition, the memory 110 has secured therein an image data storage area 112, and stores a destination table 118. Image data read by the image input unit 120 and image data received by the communication unit 220 are stored in the image data storage area 112.

Destination information which is information regarding a destination is stored in the destination table 118. In the destination table 118, as identification information for identifying a transmission destination, for example, a destination number and additional information regarding a transmission destination (such as a destination name, a telephone number, and an email address) are stored in association with each other. Note that an email address and a fax number may be stored as identification information, and a plurality of items of identification information may be stored for each destination (transmission destination).

The image input unit 120 reads an image of a document and generates image data. The image input unit 120 includes, for example, a scanner apparatus provided with a device such as a charged coupled device (COD) which converts optical information to an electric signal. Note that the image input unit 120 may load an image captured by a digital camera or the like from the outside, besides a scanner apparatus, and may receive document data from another terminal via a storage medium such as a Universal Serial Bus (USB) memory or a compact flash (registered trademark) or via the communication unit 220.

The image forming unit 140 is a function unit for forming image data on a recording medium (such as recording paper). For example, recording paper is fed from a feeding tray, an image is formed on the surface of the recording paper by the image forming unit 140, and then the recording paper is ejected from an ejection tray. The image forming unit 140 includes, for example, a laser printer using an electrophotographic method.

The display unit 160 is a function unit that displays various contents. The display unit 160 includes, for example, a liquid crystal display (LCD) or an organic electroluminescence (EL) display. In addition, the display unit 160 displays an overall image on the entire display area, and a figure is displayed on the overall image.

The operation unit 180 is a function unit that receives an operation input from a user. The operation unit 180 is realized by, for example, software keys of a touchscreen integrally formed with the display unit 160, or is realized by hardware keys. Note that the operation unit 180 may be realized by an external device (such as an external keyboard or mouse).

The character recognizing unit 240 is a function unit that recognizes characters from an image. For example, an application with an optical character recognition (OCR) function is stored in the memory 110, and the application is read and executed by the controller 100 to realize processing performed by the character recognizing unit 240. Note that characters here not only include various characters and strings such as numerals, European alphabets, Chinese letters, and Hiragana and Katakana (Japanese syllabaries), but also include symbols and figures.

With these function units, under control of the controller 100, the fax machine 1 receives an image from the image input unit 120, and stores the image as image data in the image data storage area 112 of the memory 110. The character recognizing unit 240 reads destination information from the image data, and inputs the destination information. The input destination information, a preview of an image, and other messages necessary during the operation are displayed by the display unit 160. The destination information is input from the operation unit 180 and is stored as the destination table 118 in the memory 110. The communication unit 220 transmits image data stored in the image data storage area 112.

Next, the operation at the time of fax transmission of the fax machine according to the first embodiment will be described along with a flowchart.

Figure 2:
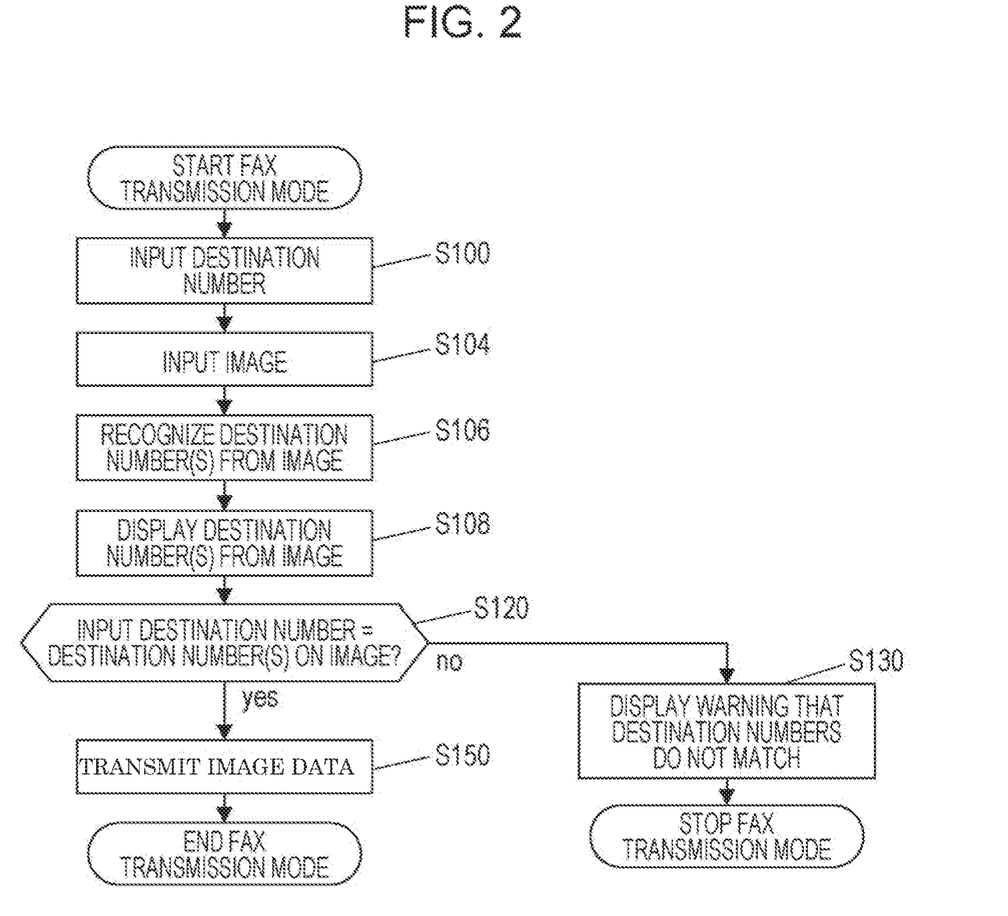
FIG. 2 is a flowchart at the time of the operation of the fax machine according to the first embodiment.

FIG. 2 is a flowchart illustrating the fax transmission operation of the fax machine according to the first embodiment.

When the fax machine 1 starts a fax transmission mode, a user inputs a destination number (identification information) from the operation unit 180 (step S100). Hereinafter, identification information will be described as a destination number in description of the fax machine.

The image input unit 120 inputs an image including a destination number(s), and stores the image as image data in the image data storage area 112 (step S104).

The character recognizing unit 240 recognizes a destination number(s) included in the image data (step S106). The controller 100 displays the recognized destination number(s) on the display unit 160 (step S108).

Although an image is input after inputting a destination number in the above description, an image may be input first (step S104) and then a destination number may be input. Alternatively, the two actions may be simultaneous.

The controller 100 compares the destination number input from the operation unit 180 with the destination number(s) recognized from the image data (step S120).

If the input destination number matches any of the recognized destination number(s), the image data is transmitted from the communication unit 220 using the matching destination number (such as the input destination number) (step S150), and the fax transmission ends.

Figure 3:
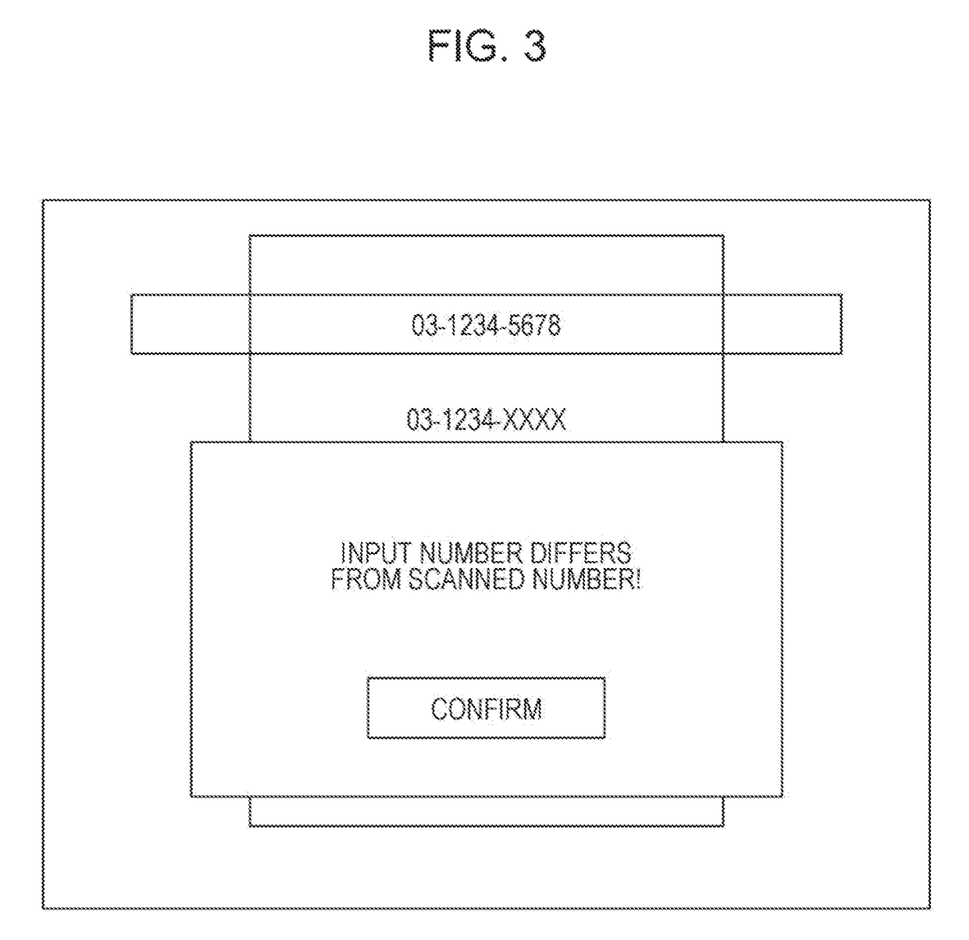
FIG. 3 is a diagram for describing an exemplary operation of the fax machine according to the first embodiment.

Alternatively, if the input destination number does not match any of the recognized destination number(s), the display unit 160 displays a warning indicating that the numbers do not match, such as that illustrated in FIG. 3 (step S130), and the operation is stopped (ended) without transmitting a fax.

In the case of the fax machine 1, the destination number in step S100 is a fax number, and is at least limited to one of destination numbers recognized by the user as fax destination numbers.

An input from the operation unit 180 in step S100 may be a key input with hardware keys, an input with software keys which are keys displayed on a touchscreen, a handwritten input, or an audio input.

An "image including a destination number(s)" input by the image input unit 120 in step S104 is an objective information source that may be a proof of a destination number input by the user in step S100 using the operation unit 180, such as the invoice of a transmission document, a business card, an envelope, or a communication document from the transmission destination. Note that whether to input an image including a destination number(s) from a transmission document or to use another image source may be selectable.

Figure 4:
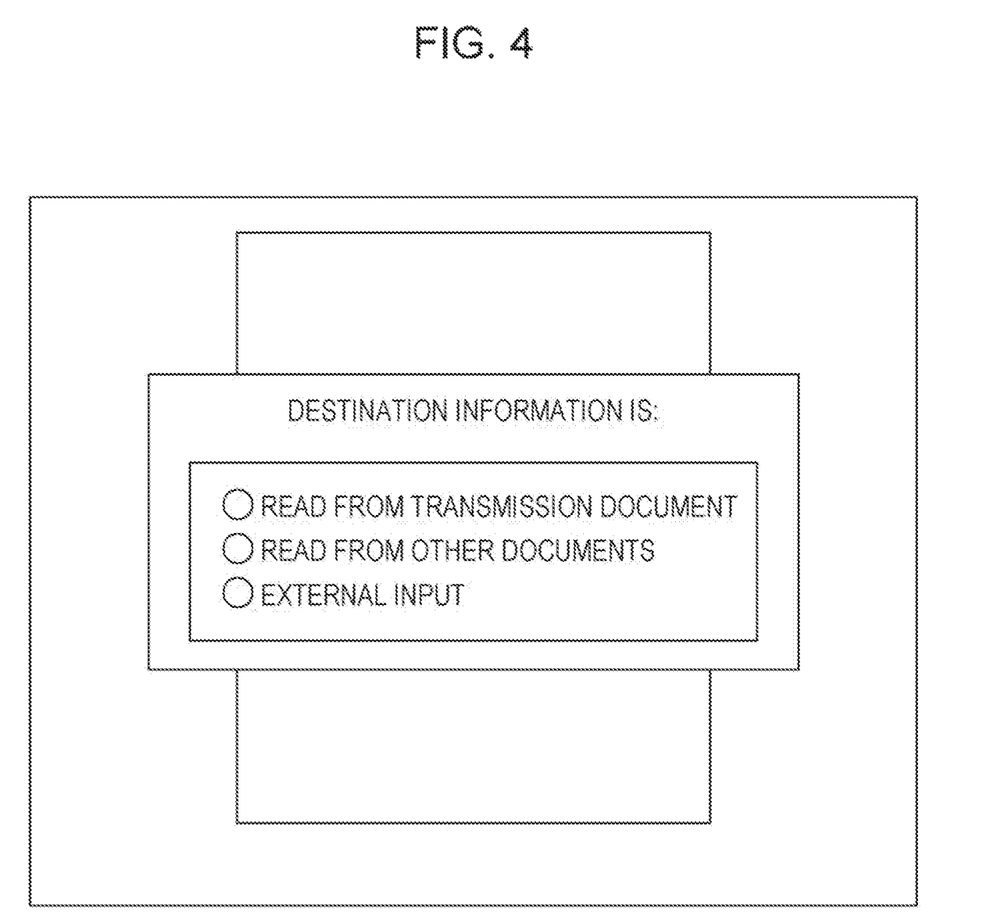
FIG. 4 is a diagram for describing an exemplary operation of the fax machine according to the first embodiment.

Furthermore, as an image including a destination number(s), a photograph taken in advance by a camera of a mobile phone or a smartphone or data in an image format separately input by a device with an image input unit such as a scanner may be input. This may be treated as an external input different from one that is input from the image input unit 120 of the fax machine 1. In conjunction with selection of an image including a destination number(s) as above, a screen such as that illustrated in FIG. 4 may be displayed so that the selection can be made.

In many cases, it is not always the case that only a fax number is written on an image including a destination number(s), and, in particular, a telephone number that is difficult to be distinguished from a fax number is often additionally written. In such a case, all the recognizable numbers that may be candidates for a fax number may be recognized in step S106, and may be displayed in step S108.

In the case where the information source of an image including a destination number(s) is a transmission document, the transmission source's telephone number and fax number may also be displayed, resulting in an increase in the number of destination numbers serving as candidates, which are recognized in step S106. However, when it is clear that a recognized number is a number assigned to the fax machine 1 itself, this number may be excluded in advance from a destination number(s) displayed in step S108.

If the input destination number matches one of the destination number(s) recognized from the image data, the communication unit. 220 transmits image data from the image data storage area 112 using the input destination number (step S150), and the fax transmission mode ends. If the input destination number does not match any of the destination number(s), a warning screen is displayed on the display unit 160 in step S130, and the process is stopped (ended) without transmitting a fax.

Second Embodiment

Figure 5:
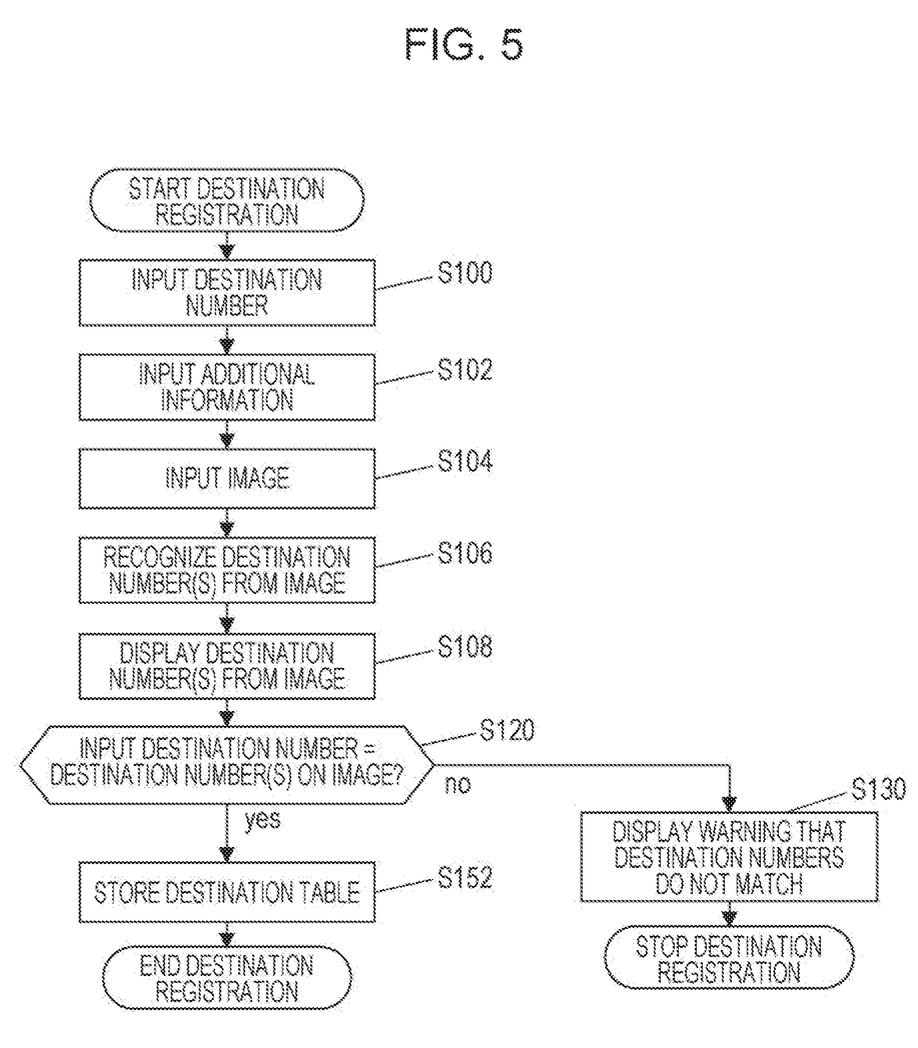
FIG. 5 is a flowchart at the time of the operation of the fax machine according to the second embodiment.

Next, a second embodiment will be described along with a flowchart illustrated in FIG. 5. In the second embodiment, steps common to those in the first embodiment are given the same step numbers, and descriptions thereof are omitted. The same applies to the following embodiments.

In the second embodiment, following an input of a destination number in step S100, additional information is input from the operation unit 180 (step S102).

Hereinafter, as in the first embodiment, the process proceeds from an input from the image input unit 120 (step S104) to comparison between the input destination number and a recognized destination number(s) (step S120).

In comparison in step S120 between a destination number input by the user from the operation unit 180 and a recognized destination number(s), if the input destination number matches any of the recognized destination number(s), the controller 100 stores the destination number and the additional information as a destination table 118 in the memory 110 (step S152), and ends the destination registration.

In comparison of the destination numbers in step S120, if the input destination number does not match any of the recognized destination number(s), as in the first embodiment, a warning screen is displayed on the display unit 160 in step S130, and then the process is stopped (ended) without registering a destination.

Third Embodiment

Figure 6:
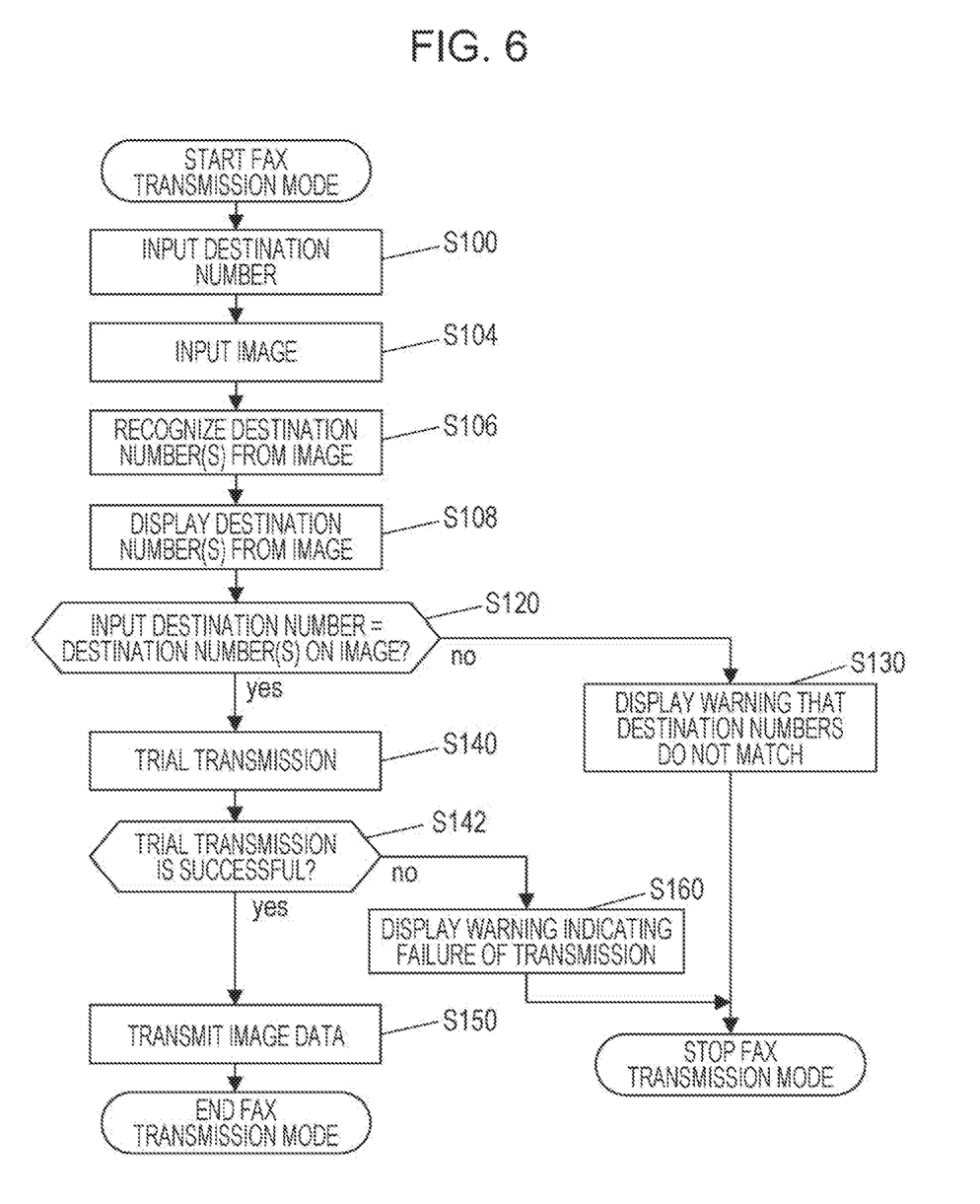
FIG. 6 is a flowchart at the time of the operation in a transmission mode of a fax machine according to a third embodiment.

Next, a third embodiment will be described along with a flowchart illustrated in FIG. 6.

In step S120 of the first embodiment, when a destination number input by the user from the operation unit 180 is compared with a destination number(s) recognized from an image and if the input destination number matches at least one of the recognized destination number(s), the controller 100 continuously tries to transmit, from the communication unit 220 to the input destination number, a contact form for confirming whether communication is possible or not (step S140).

The controller 100 determines whether the trial transmission is successful or not (step S142), and, if the trial transmission is successful, it is confirmed that the destination number is appropriate. The controller 100 causes the communication unit 220 to transmit image data input in step S104 and stored in the image data storage area 112 (step S150), and ends the fax transmission mode.

Figure 7:
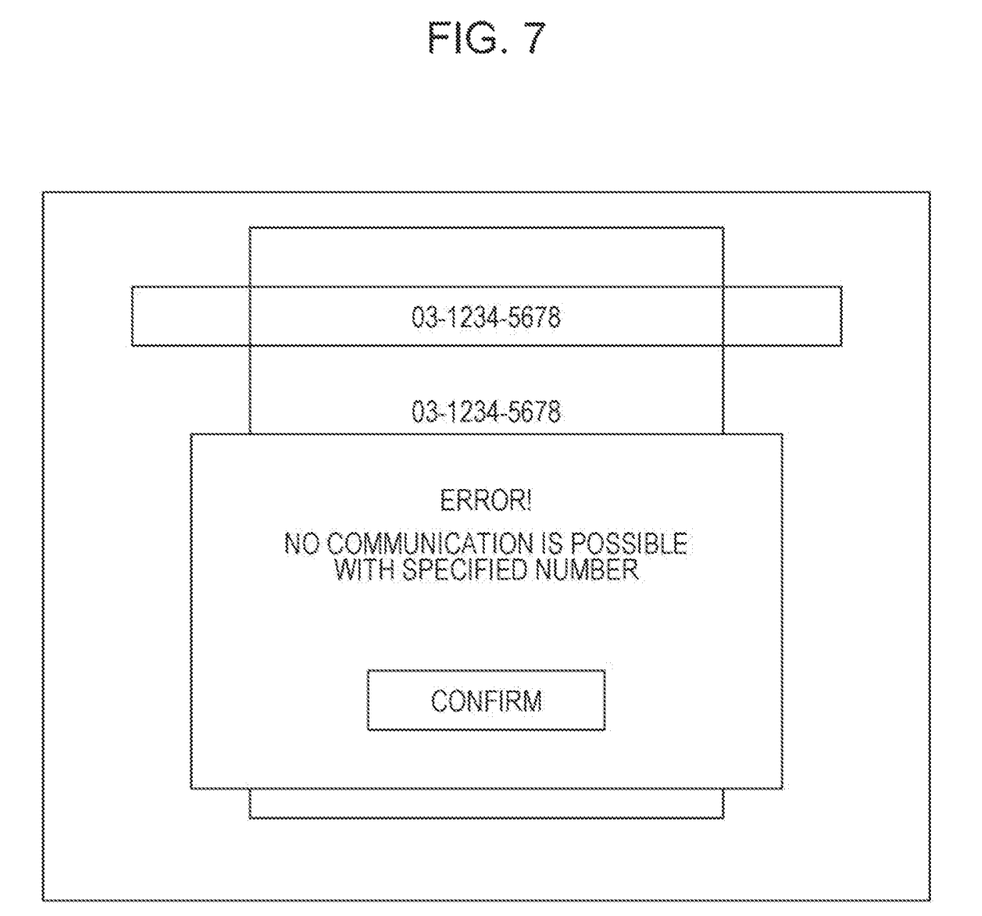
FIG. 7 is a diagram for describing an exemplary operation of the fax machine according to the third embodiment.

If the trial transmission is unsuccessful in step S142, it means that the destination number is inappropriate. As illustrated in FIG. 7, the controller 100 displays a warning indicating a failure of transmission from the display unit 160 (step S160), and stops the fax transmission mode.

The contact form may include only details that do not conflict with confidential information. In addition, if it is possible to exchange information that enables determination of whether or not communication is possible without transmitting a contact form itself, it is not necessary to actually transmit a document to a transmission destination.

Figure 8:
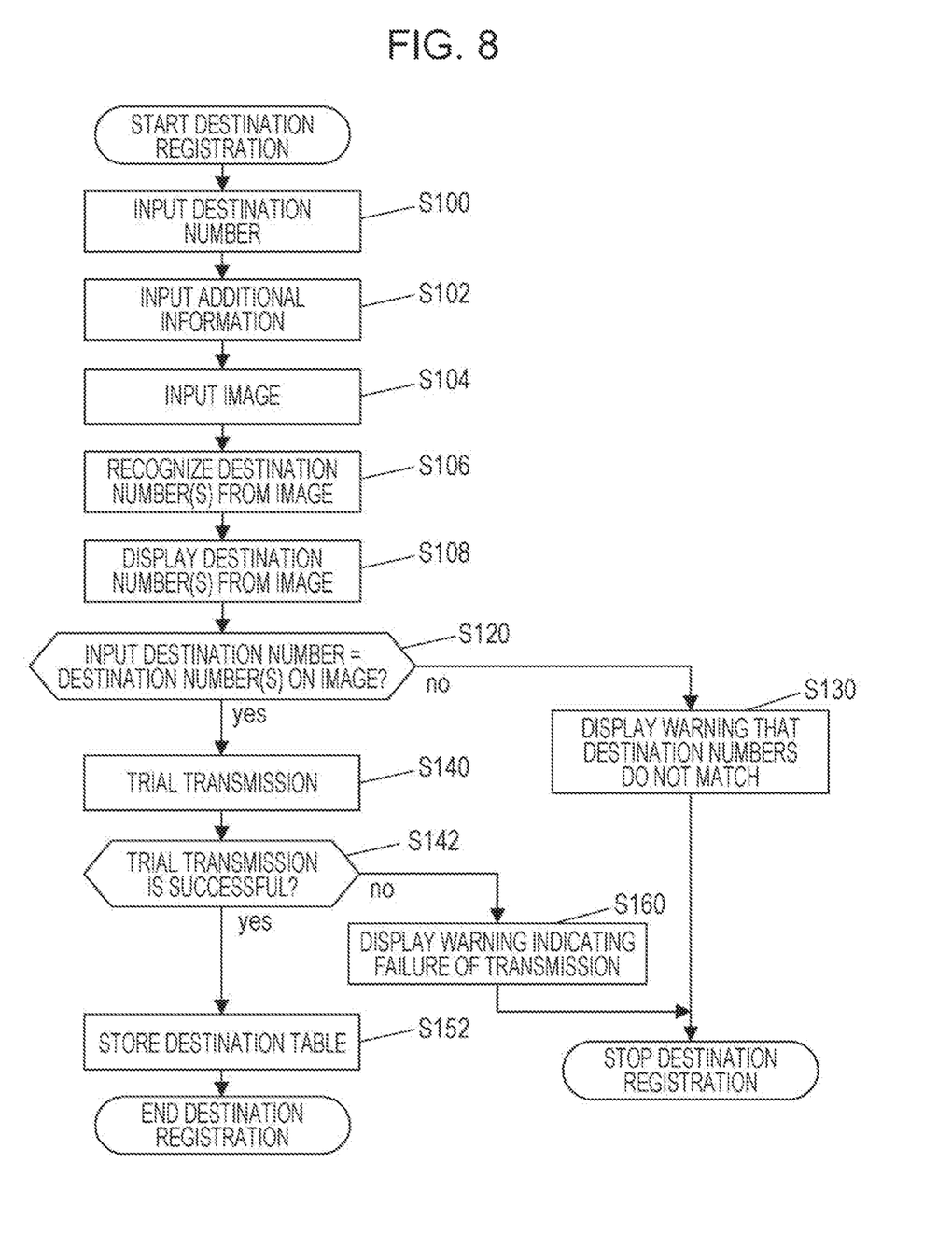
FIG. 8 is a flowchart at the time of the operation of the fax machine for destination registration according to the third embodiment.

Similarly, the case of registering destination information as a destination table will be described along with a flowchart illustrated in FIG. 8.

The controller 100 determines whether or not the trial transmission is successful (step S142), and, if the trial transmission is successful, it is confirmed that the destination number is appropriate. The controller 100 stores, along with additional information input by the user from the operation unit 180 in step S102, the destination number (identification information) as a destination table 118 in the memory 110 (step S152), and ends the destination registration.

If the trial transmission is unsuccessful in step S142, the controller 100 displays a warning indicating a failure of transmission from the display unit 160 (step S160), and stops the destination registration since the destination number is inappropriate.

Fourth Embodiment

Next, a fourth embodiment will be described. The fourth embodiment is an embodiment in which, in the first and second embodiments, in processing in step S120 for comparing a destination number input by the user from the operation unit 180 with a destination number(s) recognized from an image in step S106, whether there is a match is determined by extracting only numerals and excluding symbols and characters other than numerals.

A destination number(s) recognized from an image includes, as the information source of an image including a destination number(s), symbols such as hyphen "-", plus "+" and parentheses "( )" because the image is based on a document such as a transmission document or a name card. In addition, the recognized destination numbers are written in their individual formats, which are not necessarily a unified format. However, because the comparison is about numerals, the determination can be simplified and its accuracy can be improved by excluding only numerals.

Fifth Embodiment

A fifth embodiment is one in which, in the case of the fourth embodiment, in a numeral string obtained by extracting only numerals from a destination number, whether there is a match is determined by comparing only specific digits.

A destination number recognized from an image may include numbers such as an area code and a country code. In contrast, in the case where the user inputs a destination number, the user may input a destination number while omitting an area code if the transmission partner is within the same area. In the case of a number without an area code, it is sufficient to compare only the last six to eight digits. That is, the fifth embodiment is an embodiment in which, in comparison of destination numbers in the above-described first to third embodiments, a determination is made by comparing only the last six to eight digits of the destination numbers.

Sixth Embodiment

Next, a sixth embodiment will be described. The sixth embodiment is one in which, in the first and second embodiments, regarding the order of the process from steps S100 to S102 in which the user inputs a destination number from the operation unit 180 and the process from steps S104 to S108 in which a destination number(s) is recognized from an image, the process of recognizing a destination number(s) from an image precedes the other process. That is, the sixth embodiment is different from the flowchart of FIG. 2 which describes the first embodiment and the flowchart of FIG. 5 which describes the second embodiment in the point that, after performing the process from step S104 to S108, the process from step S100 to S102 is performed.

Figure 9:
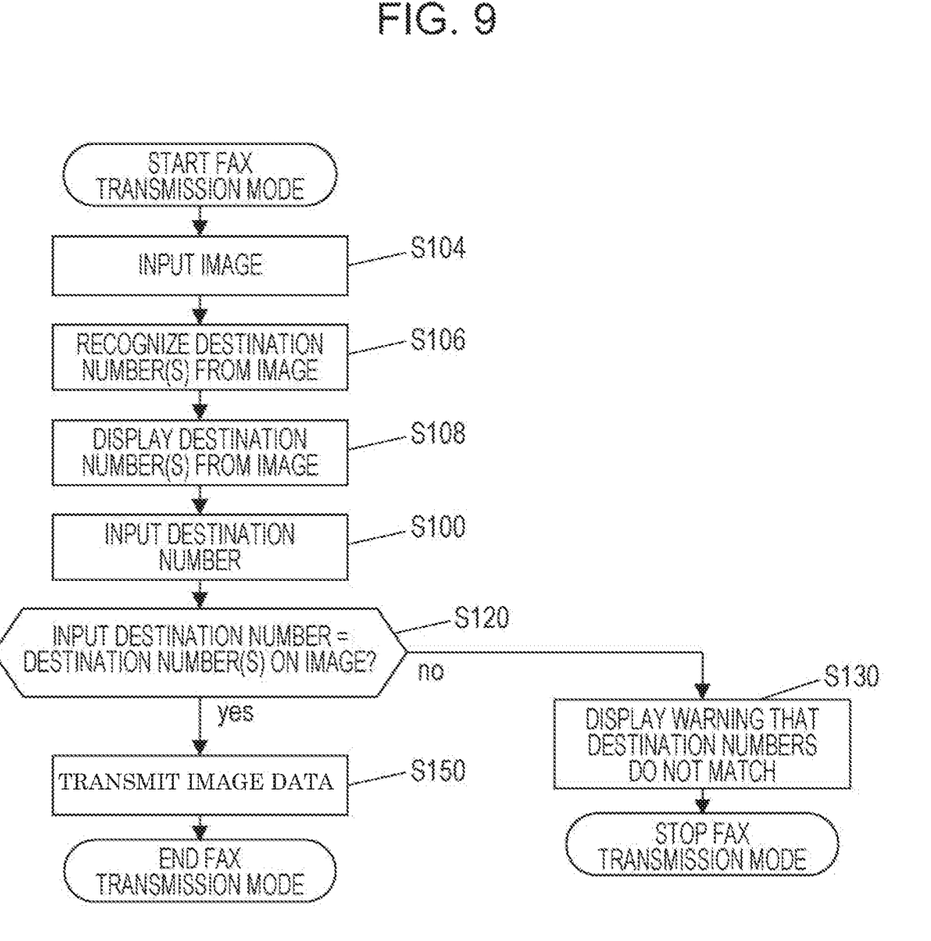
FIG. 9 is a flowchart at the time of the operation of a fax machine according to a sixth embodiment.

In the case of performing fax transmission in the sixth embodiment, as illustrated in the flowchart of FIG. 9 the order of some steps is identified. In accordance with identification of the order, as the flow proceeds with the steps, difference occurs in information and messages displayed by the display unit 160 and operation on the operation unit 180, resulting in changes in how the flow proceeds with the steps.

Figure 10:
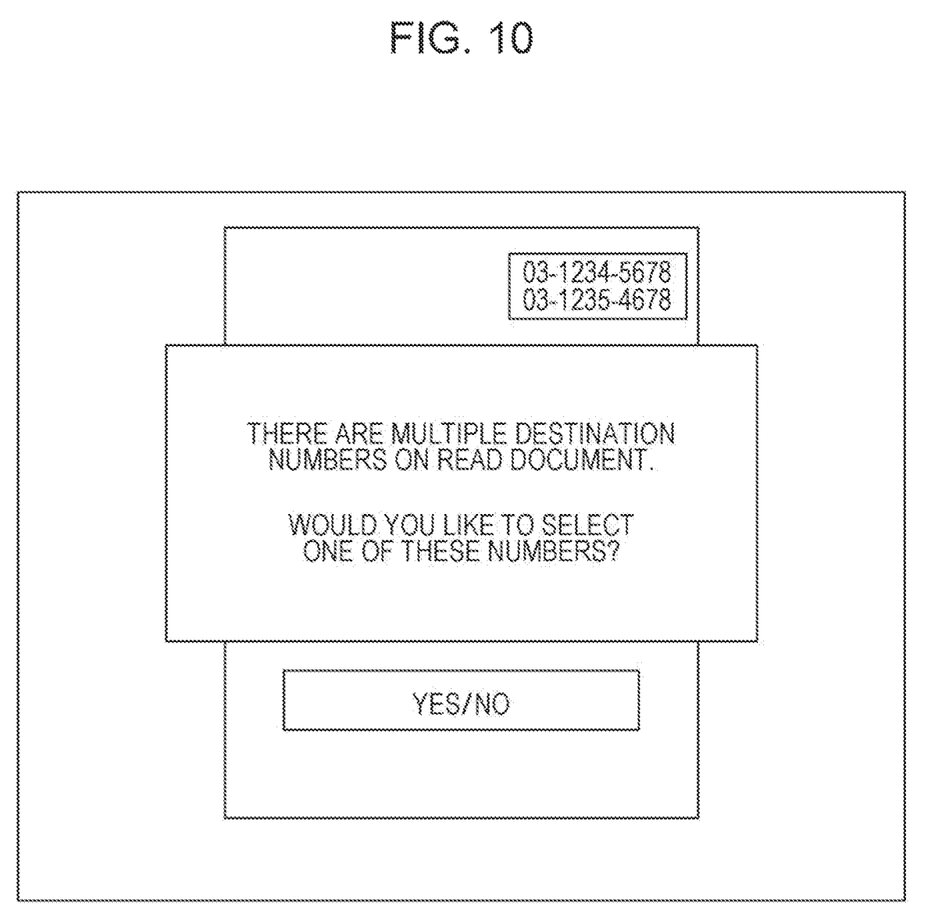
FIG. 10 is a diagram for describing an exemplary operation of the fax machine according to the sixth embodiment.

For example, as illustrated in FIG. 10, even in the case where the user is not particularly conscious of preparing the information source of a destination number, if a destination number is written on a transmission document, the user may be notified of the fact that a destination number candidate is written, and may be prompted to select and check that destination number.

Figure 11:
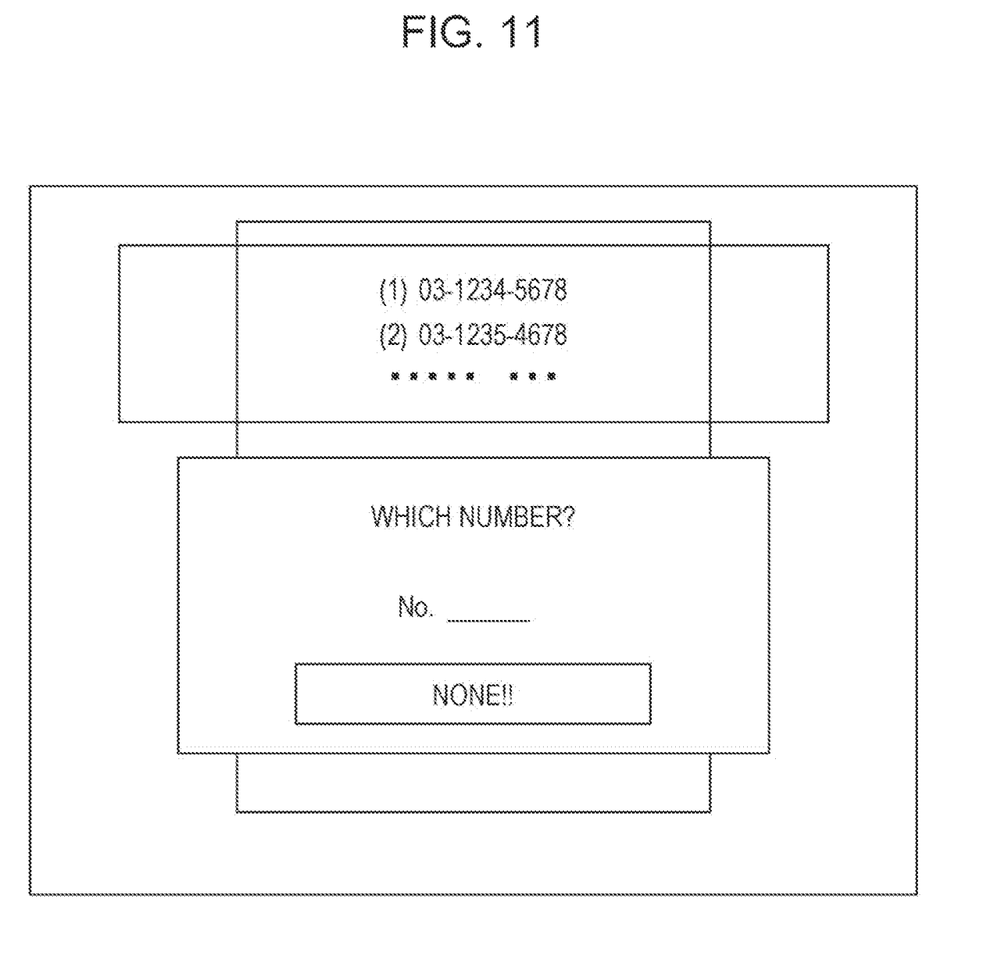
FIG. 11 is a diagram for describing an exemplary operation of the fax machine according to the sixth embodiment.

In addition, as illustrated in FIG. 11, because destination numbers have been already recognized from the image data (step S106) and displayed (S108) before the user inputs a destination number, the user may be prompted to select one from the pre-displayed candidates, instead of inputting by the user a destination number itself in step S100.

Needless to say, although an example in which the fax machine includes a controller, a communication unit, an image input unit, an operation unit, a display unit, a memory, and a character recognizing unit has been described in the above embodiments, other methods may be used to implement the technology disclosed in these embodiments. For example, a display may be used as the display unit 160, and a camera or the like may be used as the image input unit 120. By connecting a computer for control to the image input unit 120 and the display unit 160, the present technology may be implemented as a fax transmission method.

Needless to say, although the above-described embodiments are described individually for convenience of description, the embodiments may be combined and executed within a technically feasible range.

As described above, the embodiments described in the present specification may be combined and executed within a range without contradiction.

In addition, a program running on each apparatus in the embodiments is a program for controlling a CPU or the like (a program causing a computer to function) to realize the functions of the above-described embodiments. Information handled by these apparatuses is temporarily accumulated in a temporary storage device (such as random access memory (RAM)) at the time of processing, and then the information is stored in a storage device such as various types of read-only memory (ROM), hard disk drive (HDD), or solid-state drive (SSD), and is read, corrected, and written as needed by the CPU.

Although the above-described embodiments discuss confirmation and registration of a destination at the time of transmuting a fax, the embodiments are applicable to confirmation and registration of a destination at the time of transmitting an email message or a fax via the Internet.

Although the fax machine is described as an example of an image communicating apparatus in the above-described embodiments, the embodiments are applicable to other similar apparatuses. For example, the embodiments are applicable to the case of transmitting an image to a transmission destination using an email address as destination information in an information processing apparatus such as a computer, a mobile phone, or a smartphone.

Note that images (image data) communicated in the above-described embodiments include, besides image data used in fax communication, not only common image data (such as bitmap (BMP), Joint Photographic Experts Group (JPEG), and Tagged Image File Format (TIFF)), but also document files (such as text files and Portable Document Format (PDF) files).

As described above, the present disclosure is not limited to the above-described embodiments, and various modifications are possible within the scope of the claims. It is apparent to those skilled in the art that various changes or modifications are conceivable within the scope described in the claims. That is, an embodiment obtained by combining technical means appropriately changed within a scope not deviating from the gist of the present disclosure is also included in the technical scope of the present disclosure.

By using the present technology, transmission to or registration of a wrong destination can be prevented, and an image can be transmitted to an appropriate transmission destination.

The present disclosure contains subject matter related to that disclosed in Japanese Priority Patent Application JP 2018-006504 filed in the Japan Patent Office on Jan. 18, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image communicating apparatus comprising:
    a controller;
    a communication device that transmits an image to a transmission destination of input destination information; and
    a character recognizing device that recognizes, from an image including destination information of a transmission destination, the destination information, wherein:
    the controller causes the communication device to transmit an image to the transmission destination in a case where the recognized destination information matches the input destination information.

2. An image communicating apparatus comprising:
    a controller;
    a memory that stores input destination information; and
    a character recognizing device that recognizes, from an image including destination information of a transmission destination, the destination information, wherein:
    the controller causes the memory to store the input destination information in a case where the recognized destination information matches the input destination information.

3. The image communicating apparatus according to claim 2, wherein the destination information includes identification information to identify the transmission destination, and additional information regarding the transmission destination.

4. The image communicating apparatus according to claim 1, further comprising:
    a display device, wherein:
    the controller displays a warning screen on the display device without transmitting an image to the transmission destination in a case where the recognized destination information does not match the input destination information.

5. The image communicating apparatus according to claim 2, further comprising:
    a display device, wherein:
    the controller displays a warning screen on the display device without storing the input destination information in the memory in a case where the recognized destination information does not match the input destination information.

6. The image communicating apparatus according to claim 1, wherein the controller causes the communication device to perform trial transmission to the transmission destination in a case where the recognized destination information matches the input destination information.

7. The image communicating apparatus according to claim 2, wherein the controller causes the communication device to perform trial transmission to the transmission destination in a case where the recognized destination information matches the input destination information.

8. The image communicating apparatus according to claim 1, wherein the controller extracts only one or more numerals and makes a determination in a case of determining whether the recognized destination information matches the input destination information.

9. The image communicating apparatus according to claim 2, wherein the controller extracts only one or more numerals and makes a determination in a case of determining whether the recognized destination information matches the input destination information.

10. The image communicating apparatus according to claim 8, wherein the controller further extracts only one or more specific digits from a numeral string obtained by extracting only one or more numerals and makes a determination in a case of determining whether the recognized destination information matches the input destination information.

11. The image communicating apparatus according to claim 9, wherein the controller further extracts only one or more specific digits from a numeral string obtained by extracting only one or more numerals and makes a determination in a case of determining whether the recognized destination information matches the input destination information.

12. The image communicating apparatus according to claim 1, wherein the controller recognizes destination information from an image including the destination information before an input of destination information.

13. The image communicating apparatus according to claim 2, wherein the controller recognizes destination information from an image including the destination information before an input of destination information.

14. A control method for an image communicating apparatus that transmits an image to a transmission destination of input destination information, comprising:
    inputting destination information;
    recognizing, from an image including destination information of a transmission destination, the destination information; and
    determining whether the input destination information matches the recognized destination information, wherein:
    an image is transmitted in a case where the input destination information matches the recognized destination information.

15. A control method for an image communicating apparatus including a memory that stores input destination information, comprising:
    inputting destination information;
    recognizing, from an image including destination information of a transmission destination, the destination information; and
    determining whether the input destination information matches the recognized destination information, wherein:
    the input destination information is stored in a case where the input destination information matches the recognized destination information.

* * * * *